(12) United States Patent
Kumar O S et al.

(10) Patent No.: US 12,030,379 B2
(45) Date of Patent: Jul. 9, 2024

(54) HAND ACCELERATION CONTROL SYSTEM AND METHOD FOR ACCELERATING THE OFF-ROAD VEHICLE

(71) Applicant: Mahindra & Mahindra Limited, Tamilnadu (IN)

(72) Inventors: Anand Kumar O S, Tamilnadu (IN); Senthil Prabhu N, Tamilnadu (IN); Shashank Sekhar Sahu, Tamilnadu (IN)

(73) Assignee: Mahindra & Mahindra Limited, Tamilnadu (IN)

( * ) Notice: Subject to any disclaimer, the term of this patent is extended or adjusted under 35 U.S.C. 154(b) by 0 days.

(21) Appl. No.: 18/357,972

(22) Filed: Jul. 24, 2023

(65) Prior Publication Data
US 2024/0116362 A1    Apr. 11, 2024

(30) Foreign Application Priority Data
Oct. 10, 2022 (IN) .............................. 202241057882

(51) Int. Cl.
*B60K 26/02* (2006.01)

(52) U.S. Cl.
CPC ........ *B60K 26/02* (2013.01); *B60K 2026/028* (2013.01)

(58) Field of Classification Search
CPC .......................... B60K 26/02; B60K 2026/028
USPC .......................................................... 123/399
See application file for complete search history.

(56) References Cited

U.S. PATENT DOCUMENTS

| | | | |
|---|---|---|---|
| 6,293,757 B1 * | 9/2001 | Oda .................... | F02D 41/3845 123/456 |
| 2014/0305410 A1 * | 10/2014 | Lucas .................. | F02M 59/464 123/456 |

FOREIGN PATENT DOCUMENTS

| | | | | |
|---|---|---|---|---|
| CN | 104709085 A | * | 6/2015 | |
| CN | 106427561 A | * | 2/2017 | ............. B60K 26/02 |
| CN | 110217104 A | * | 9/2019 | ............. B60K 26/02 |
| JP | 08188059 A | * | 7/1996 | |
| JP | 2013043531 A | * | 3/2013 | |

OTHER PUBLICATIONS

CN-106427561-A (Zhang et al.) (Feb. 22, 2017) (Machine Translation) (Year: 2017).*
JP-08188059-A (Noritaka, Ito) (Jul. 23, 1996) (Machine Translation) (Year: 1996).*

* cited by examiner

*Primary Examiner* — Mahmoud Gimie
(74) *Attorney, Agent, or Firm* — PILLSBURY WINTHROP SHAW PITTMAN LLP; Robert M. Bedgood; Jeffrey Sheriff

(57) ABSTRACT

The present invention provides a hand acceleration control system to control and set Engine RPM at constant speed. The hand acceleration control system is controlled by a rotating switch (20) preferable positioned on a steering wheel.

8 Claims, 4 Drawing Sheets

HAND ACCELERATION CONTROL SYSTEM AND METHOD FOR ACCELERATING THE OFF-ROAD VEHICLE

RELATED APPLICATIONS

This patent application claims the benefit of priority to India Patent Application No. 202241057882, filed Oct. 10, 2022. The entire contents of the foregoing application is incorporated herein by reference.

TECHNICAL FIELD OF INVENTION

The present invention relates to acceleration mechanism of the vehicle and more particularly, to a hand acceleration system and method for the off-road vehicles.

BACKGROUND OF INVENTION

Acceleration systems of off-road vehicles for example tractors, earth movers, etc., include a foot operated accelerator pedal and a hand operated accelerator lever. Upon actuation of the accelerator pedal and/or the hand operated accelerator lever, the accelerator system that is operably connected with the fuel injection pump injects an appropriate amount of fuel into the engine thereby accelerating the off-road vehicle. It is essential for the off-road vehicles to have both the accelerating options because unlike on-road vehicles the off-road vehicles work in fields that may have uneven surfaces. When running on uneven surfaces, running the off-road vehicle along with the implement, in order to achieve smooth running of vehicle, better fuel efficiency, and better soil preparation by using the implement like Rotavator, cultivator it is desirable to set the hand accelerator lever at a particular position (set RPM). This ensures that the engine of the off-road vehicle receives a constant amount of fuel and the vehicle runs at a constant speed irrespective of any obstructions. Thus, the operator is saved from continuously pressing the accelerator pedal.

Further, it is to be noted here that actuation of the accelerator pedal and the accelerator lever is interdependent on each other to offer smooth and better field operations. For example, when operating in farm field, it is not only desirable to continuously operate the off-road vehicle at a constant speed but also to achieve further instantaneous acceleration or de-acceleration above the set constant speed. In such a situation, the accelerator lever is typically set in a particular position (Set RPM) to set the off-road vehicle running at constant speed. Further, by the usage of accelerator pedal the operator could further instantaneously increase or decrease the speed of the vehicle above the constant speed.

In conventional off-road vehicles, one of the ways by which both the accelerator lever and the accelerator pedal are operatively interconnected to each is via mechanical linkages. Such mechanical actuation arrangements have several drawbacks due to presence of more number of mechanical linkages/parts. Due to this, more leverage in controlling the mechanical components/parts is required which may lead in under-acceleration or over-acceleration of the off-road vehicles. Further, relative mechanical movements between the joints also poses significant problems. Besides these, wear and tear of the joints between the linkages may affect reliability and durability of the mechanical arrangement over the period. Further, driver may not be able to adjust the Hand accelerator preciously based on use of Various Tractor Implements, which require different operating speed. Also reach of Hand accelerator lever is also difficult, since it is below steering wheel.

Accordingly, there is need of a user-friendly hand acceleration control system to control Engine RPM.

SUMMARY OF THE INVENTION

In one aspect, the present invention provides a hand acceleration control system for vehicle. The system includes a switch rotatably positioned on a steering wheel of the vehicle. Rotation of the switch creates a voltage difference based on a change in resistance. An engine control unit (ECU) is configured to receive signals from the switch and a foot accelerator to supply required fuel amount to the engine based on the voltage difference to keep the engine running at predefined speed. The switch is manually rotated and pressed for setting a predefined speed in RPM. The ECU is configured to supply fuel to the engine via a high pressure pump receiving fuel from a fuel tank and supplying to a common rail. The ECU is configured to communicate to the high pressure pump via actuator.

In another aspect, the present invention provides a method for acceleration control system. In the first step, the switch is rotated upto the marking of desired RPM and pressed to freeze/set the selected RPM. In case the engine is turned off at previously set RPM, then on turning ON of the engine, already preset switch position RPM is executed only by pressing the switch and there is no need to reset the switch position again. In the next step, a signal from the switch is transmitted to the ECU. In the next step, the ECU determines the amount of fuel to be supplied to an engine by the ECU based on the signals received from the switch. In the next step, the determined amount of fuel is supplied to the engine a high fuel pump thereby setting the engine at the constant pre-set speed. The signal transmitted to the ECU is a voltage difference based on the change in resistance caused by rotation of the switch. The amount of fuel supplied to the high fuel pump (40) is based on higher voltage between the switch and the foot accelerator.

The signal from the switch is transmitted to the ECU through wiring harness.

BRIEF DESCRIPTION OF DRAWING

The foregoing and other features of embodiments of the present invention will become more apparent from the following detailed description of embodiments when read in conjunction with the accompanying drawings. In the drawings, like reference numerals refer to like elements.

Reference will be made to embodiments of the invention, examples of which may be illustrated in accompanying figures. These figures are intended to be illustrative, not limiting. Although the invention is generally described in context of these embodiments, it is not intended to limit the scope of the invention to these embodiments.

DETAILED DESCRIPTION OF THE INVENTION

In the following detailed description, reference is made to the accompanying drawings that form a part hereof, and in which shown by way of illustration specific embodiments that may be practiced. These embodiments are described in sufficient detail to enable a person skilled in the art to practice the invention, and it is to be understood that other embodiments may be utilized and that logical, mechanical, and other changes may be made within the scope of the embodiments.

Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. The singular forms "a," "an," and "the" include plural references unless the context clearly dictates otherwise. The following detailed description is, therefore, not be taken as limiting the scope of the invention, but instead the invention is to be defined by the appended claims.

In general aspect, the present invention provides a hand acceleration control system to control Engine RPM. The hand acceleration control system is controlled by a rotating switch preferable positioned on a steering wheel.

Figure 1:
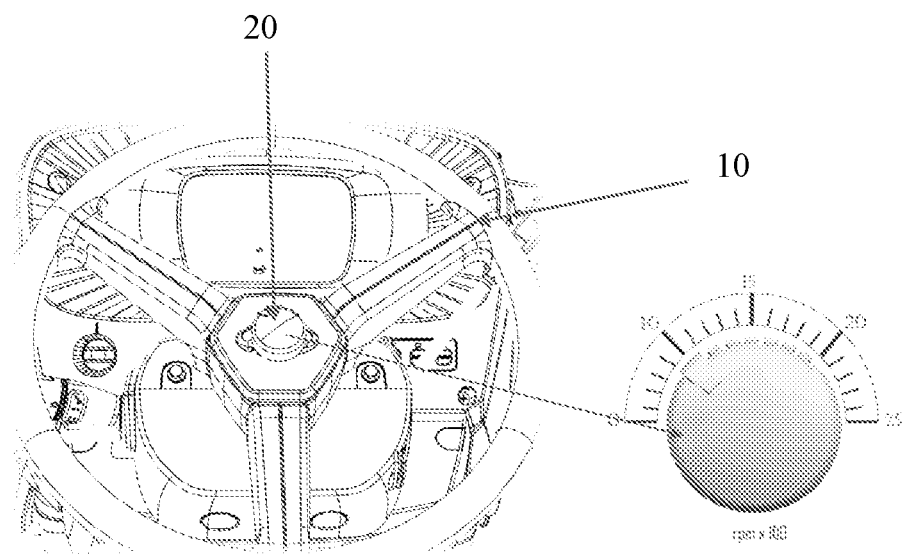
FIG. 1 illustrates a hand acceleration control system in accordance with an embodiment of the present invention.
Figure 2A:
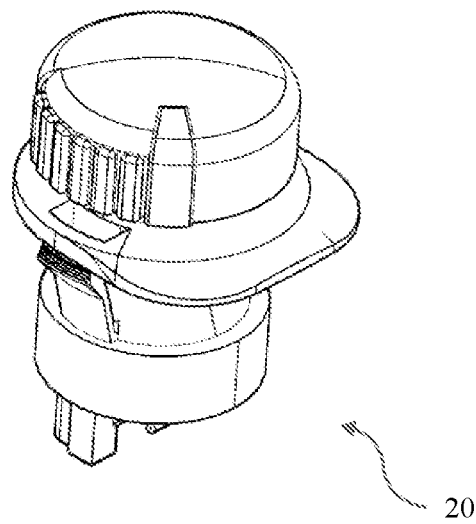
FIGS. 2A and 2B illustrate a perspective and side view of a switch of the system of FIG. 1.
Figure 2B:
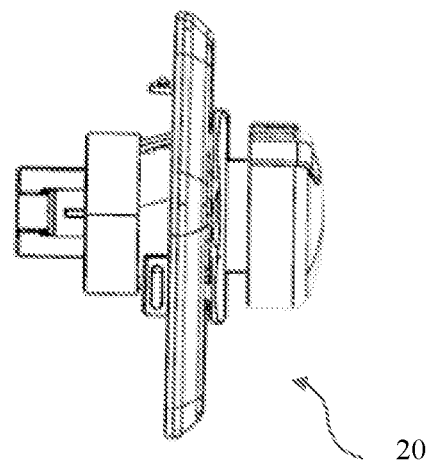

Referring to FIGS. 1-2B a steering wheel (10) having a rotary push type switch (20) positioned thereon is shown. The switch (20) is used for sending input to an Engine ECU (30). The engine rpm is controlled by rotating the switch (20) in clockwise or counter clockwise manner and engaging by pressing the switch (20). In accordance with an embodiment, the switch (20) is mounted at centre location on steering wheel (10). The switch (20) and a steering cap (22) are sub-assembled and then fitted along with the steering wheel (10). The switch (20) is connected to a Tractor Main assembly through the steering wheel (10). However, it is understood here that the switch (20) may be mounted on side and easily accessible to the user. Signal from switch (20) are sent to engine control unit (hereinafter referred as "ECU (30)") through wiring harness.

The engine ECU (30) controls the fueling of the engine based on the inputs received from the switch.

Figure 3:
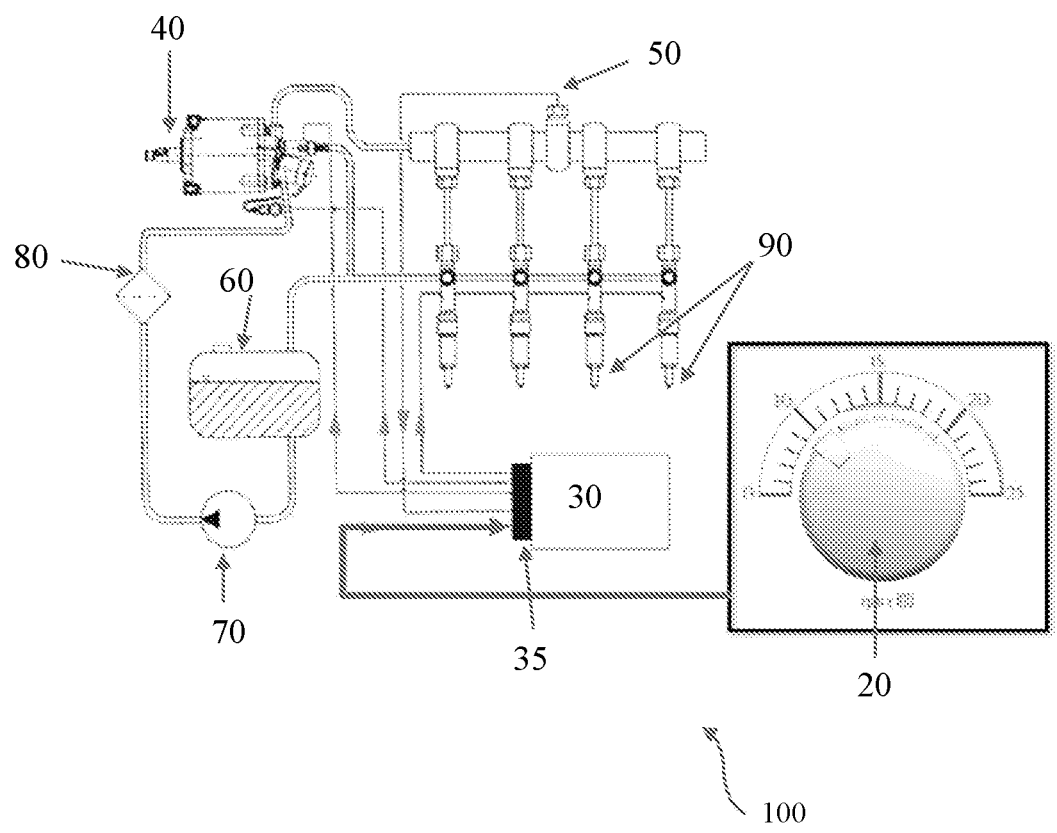
FIG. 3 illustrates the system of FIG. 1.
Figure 4:
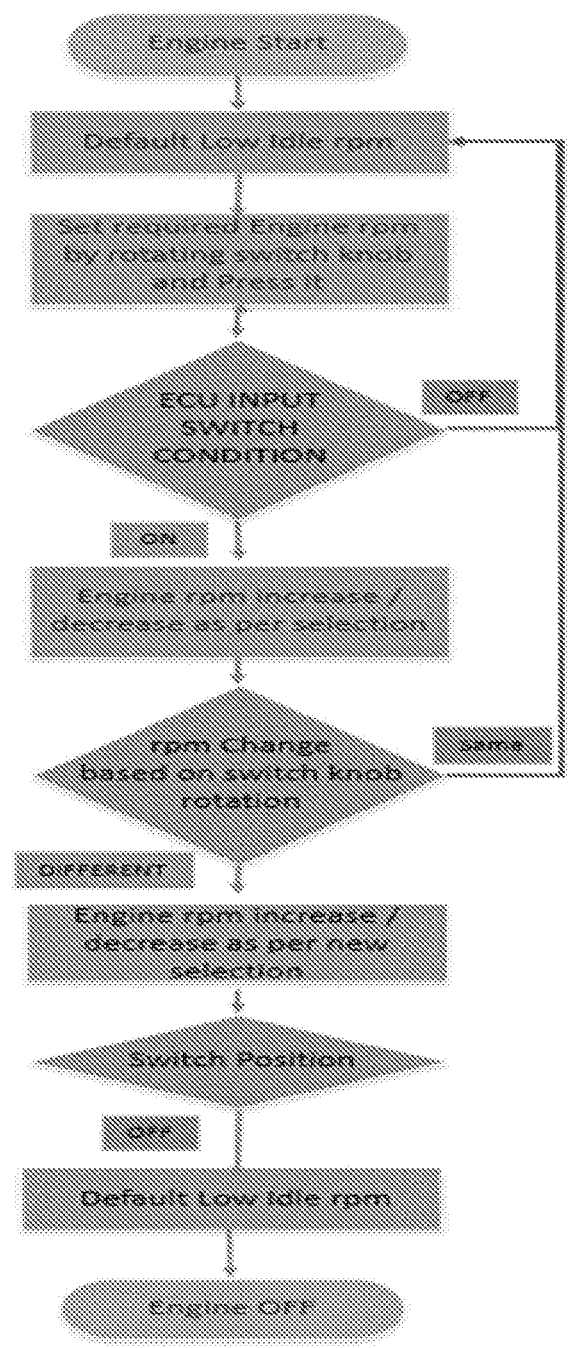
FIG. 4 illustrates a schematic diagram of the system of FIG. 1.

Referring to FIGS. 3 and 4, a hand acceleration control system (100) and working of the system (100) is shown. The system (100) includes the switch (20) positioned on the steering wheel. The switch (20) receives the inputs from the user. When the switch (20) is rotated, it creates a voltage difference based on the change in resistance that is transmitted to the ECU (30) as an input along with the input from the foot accelerator. The ECU (30) is configured to supply the required fuel amount to the engine based on the voltage difference to keep the engine running at predefined speed. The ECU (30) is configured to communicate with a high pressure pump (40), a common rail (50), a fuel tank (60) that supplies fuel to the high pressure pump (40) through a lift pump (70) and fuel filter (80). The required amount of fuel is supplied to the engine through a plurality of injectors (90). The ECU (30) communicates with these elements through an actuator (35).

Referring to FIGS. 1-4, in operation, in first step, the user rotates the switch (20) upto the marking of desired RPM and presses the switch to freeze/set the selected RPM. In this step, when the switch (20) is rotated, it creates a voltage difference based on the change in resistance. In the next step, signal from the switch (20) are sent to the ECU (30) through wiring harness. In the next step, the ECU (30) determines the amount of fuel and the signals are transmitted to high fuel pump (40) and to the fuel tank (70) through the actuator (35). The high fuel pump (40) supplies the required the determined amount of fuel to common rail (50) that further supplies fuel to the engine via injectors (90). The engine keeps running at the constant pre-set speed till the further variation in the speed created by the user.

Figure 5:
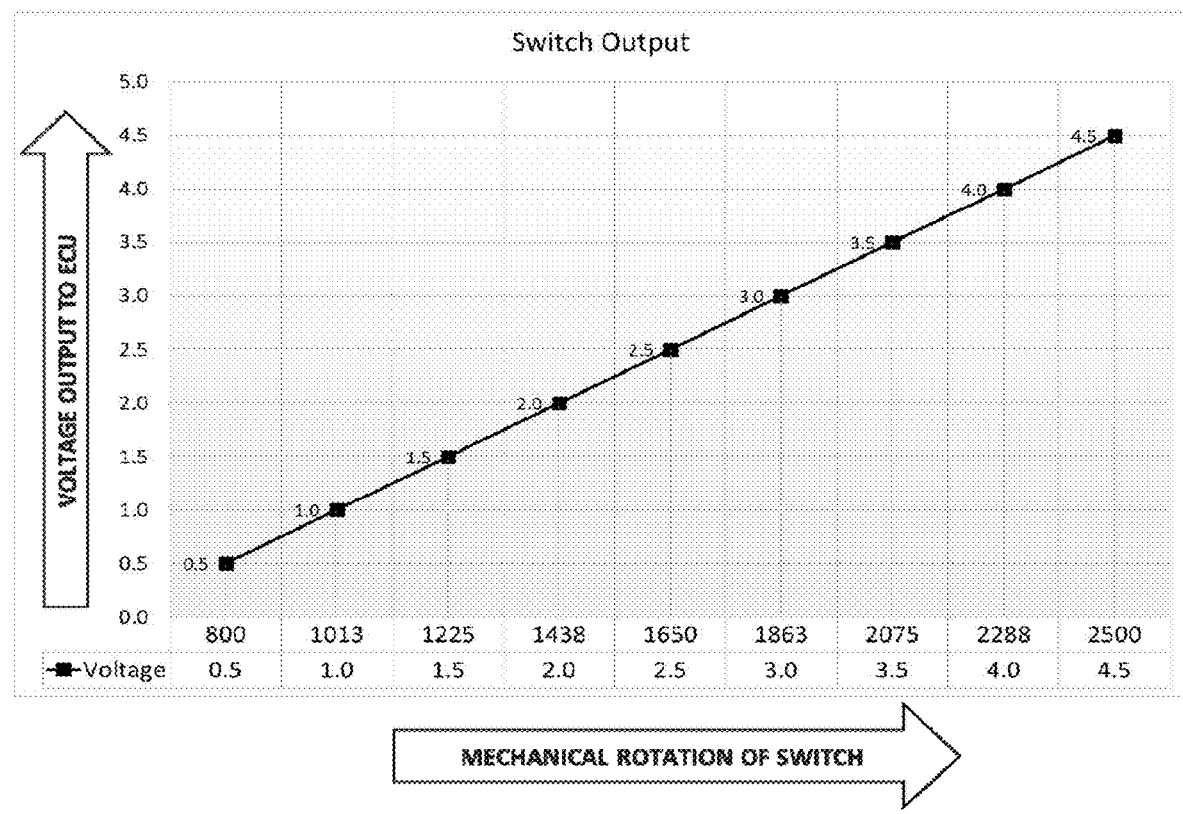
FIG. 5 illustrates graphical representation of the transmission of signals during operation of the switch.

Referring to FIG. 5, a graphical representation of the transmission of signals during operation of the switch is shown. At first step, when the switch is rotated by the user, it creates voltage difference based on the change in resistance that is provided as an input to the ECU (30). The ECU (30) receives inputs from the foot accelerator sensor and the switch (20). When the switch (20) is rotated clockwise, Voltage to the ECU (30) increases and when the switch (20) is rotated anticlockwise, the Voltage get reduced. In the next step, when the switch is pressed the ECU (30) executes the function of supplying required amount of fuel to the engine based on higher Voltage/value between the two inputs received by the ECU (30).

The system of the present invention reduces the operator fatigue, since he does not need to move the hands out of steering wheel zone. The switch (20) positioned at center position on the steering wheel (10) facilitates precision control and smooth and effortless operation of changing the engine set rpm. The switch (20) also provides more visibility for setting the rpm. When the switch (20) is pressed and a specific speed is set for the engine, the speed cannot be changed by applying brakes or any other way unless the switch (20) again set in default configuration. The present invention eliminates existing mechanical lever and moving parts. Further, an additional setting arrangement is not required for setting the Low Idle & High Idle rpm It is to be distinctly understood that the foregoing descriptive matter is to be interpreted merely as illustrative, of the invention and not as a limitation. The exemplary embodiments described in this specification are intended merely to provide an understanding of various manners in which these embodiments may be used and to further enable the skilled person in the relevant art to practice the invention.

Although, the embodiments presented in this disclosure have been described in terms of its preferred embodiments, the skilled person in the art would readily recognize that these embodiments can be applied with modifications possible within the spirit and scope of the present invention as described in this specification by making innumerable changes, variations, modifications, alterations and/or integrations in terms of materials and method used to configure, manufacture and assemble various constituents, components, subassemblies and assemblies, in terms of their size, shapes, orientations and interrelationships without departing from the scope and spirit of the present invention.

The numerical values given of various physical parameters, dimensions and quantities are only approximate values and it is envisaged that the values higher or lower than the numerical value assigned to the physical parameters, dimensions and quantities fall within the scope of the disclosure unless there is a statement in the specification to the contrary.

We claim:

1. A hand acceleration control system for an off-road vehicle, the system comprising:
   a foot accelerator sensor for generating a signal based on actuation of a foot accelerator;
   a switch rotatably positioned on a steering wheel of the vehicle, where rotation of the switch creates a voltage difference based on a change in resistance thereby generating another signal; and
   an engine control unit (ECU) configured to:
   receive the signals from the switch and the foot accelerator;

determine a higher voltage value between the signals from the switch and the foot accelerator; and supply required fuel amount to the engine based on the determined higher voltage value to keep the engine running at predefined speed.

2. The system as claimed in claim 1, wherein the switch is manually rotated and pressed for setting a predefined speed in RPM.

3. The system as claimed in claim 1, wherein the ECU is configured to supply fuel to the engine via a high pressure pump receiving fuel from a fuel tank and supplying to a common rail.

4. The system as claimed in claim 3, wherein the switch is positioned at a center of the steering wheel.

5. A method for accelerating an off-road vehicle by a hand acceleration control system, the method comprising the steps of:

rotating a switch up to a marking of desired RPM;

pressing the switch to freeze/set a selected RPM;

transmitting a signal from the switch and a foot accelerator to an ECU;

determining a higher voltage value between the signals from the switch and the foot accelerator;

determining an amount of fuel to be supplied to an engine by the ECU based on the determined higher voltage value; and supplying the determined amount of fuel to the engine high fuel pump thereby setting the engine at a constant pre-set speed.

6. The method as claimed in claim 5, wherein the signal transmitted to the ECU is a voltage difference based on the change in resistance caused by rotation of the switch.

7. The method as claimed in claim 5, wherein the amount of fuel supplied to the high fuel pump is based on higher voltage between the switch and the foot accelerator.

8. The method as claimed in claim 5, wherein the signal from the switch is transmitted to the ECU through wiring harness.

* * * * *